Figure 1:
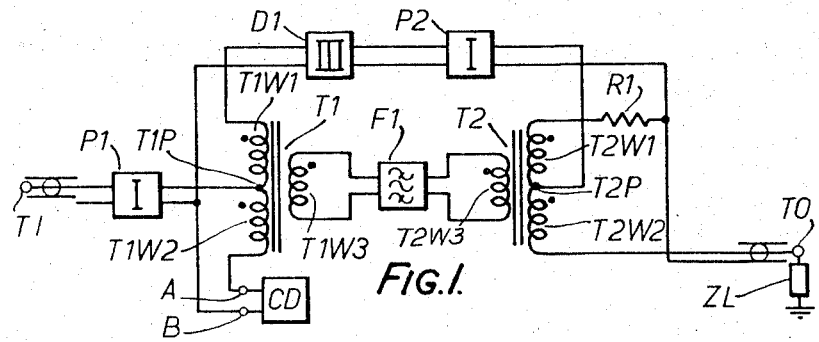

Feb. 6, 1968  I. F. MACDIARMID  3,368,029
ELECTRICAL DISTORTION CORRECTOR

Filed Aug. 20, 1965  5 Sheets-Sheet 1

IAN F. MACDIARMID,
INVENTOR

BY Hall & Houghton
ATTORNEY

United States Patent Office 3,368,029
Patented Feb. 6, 1968

3,368,029
ELECTRICAL DISTORTION CORRECTOR
Ian Ferguson Macdiarmid, Dollis Hill, London, England, assignor to Her Majesty's Postmaster General, London, England
Filed Aug. 20, 1965, Ser. No. 481,178
Claims priority, application Great Britain, Aug. 26, 1964, 35,001/64
26 Claims. (Cl. 178—5.2)

This invention relates to the correction of electrical distortions in electrical signal transmission systems, particularly in colour television systems.

In a colour television system of the N.T.S.C. type a wide-band video signal is used to transmit a luminance signal, whilst colour saturation and hue information are transmitted by amplitude and phase modulation, respectively, of a sub-carrier signal of narrower bandwidth situated near the upper end of the video frequency band. In a practical transmission system, changes in amplitude of the luminance signal introduce, by intermodulation effects, undesired variations in amplitude and phase of the sub-carrier. These variations distort the colour saturation and colour hue and are referred to as differential gain distortion and differential phase distortion, respectively. These distortions can be measured by transmission of a test signal consisting of a video waveform containing a sawtooth or staircase extending between black and white levels (luminance signal) and a superimposed small-amplitude sine-wave at sub-carrier frequency. At the receiving end of the system under test the superimposed sub-carrier signal is filtered off and its amplitude and phase displayed against the amplitude of the luminance signal. Departures from constancy of the amplitude or phase of the sub-carrier signal indicate the presence of differential gain or differential phase distortions respectively. Such distortions may be corrected by the introduction of correction signals similar to and having equal magnitude but opposite polarity to the distortions. It is with correction of differential distortion that this invention is concerned and, in appropriate embodiments of the invention, either with the correction of differential gain distortion or of differential phase distortion, or of both.

According to the present invention, apparatus for correcting differential distortion in electrical signals has a balanced hybrid transformer network including intercoupled first and second conjugate pairs of arms, of the first conjugate pair of arms one being connected to a correction impedance device adjustable to alter the balance condition of that pair of arms and the other arm connected by a direct electrical path via one arm of the second conjugate pair of arms to an output arm for the apparatus and via the other arm of the second conjugate pair of arms to an output arm balance impedance, an input arm connected to the arms of the first conjugate pair of arms and a transmission delay device connected in the direct electrical path for providing a desired phase relation between electrical signals fed to the second conjugate pair of arms by the direct electrical path and by the intercoupling between the first and second conjugate pair of arms as a result of the correction device providing an unbalanced condition to such signals. When used to correct differential gain distortion, it is required that the signals in the arms of the second conjugate pair of arms are in-phase or anti-phase with each other and when used to correct differential phase distortion that the signals in those arms are in phase quadrature. The transmission delay device in the direct electrical path may provide all or part of the delay required for these conditions to be met.

In one embodiment, suitable for use in a colour television system, the hybrid transformer network comprises a first hybrid transformer providing the first conjugate pair of arms and a second hybrid transformer providing the second conjugate pair of arms; each transformer also has a further conjugate pair of arms. One of the further arms of the first transformer is the input arm of the apparatus and the direct electrical path is connected to the second conjugate pair of arms by one of the further arms of the second transformer. The remaining further arms of the first and second transformers are coupled by a band-pass filter. The first and second conjugate pairs of arms can be defined by tapped windings on the two transformers. The tapping on the tapped winding of the first transformer defines the input arm of the apparatus and the tapping on the tapped winding of the second transformer is the further conjugate arm connecting the electrical path to the second conjugate pair of arms. The remaining further arms are defined by a winding on each of the first and second transformers which are coupled by the band-pass filter. In a particular arrangement utilising such transformers and image impedance balancing techniques, both transformers are identical and each has a turns ratio of $1+1:\sqrt{2}$.

The correction device connected to the said one arm of the first conjugate pair of arms preferably is a network the impedance of which is determined by an electrical signal and advantageously is capable of being automatically controlled. One type of such correction device comprises two oppositely poled asymmetrically conductive devices connected in series between a pair of operating terminals of the network and such that the impedance between those terminals varies in dependance on a voltage applied across the operating terminals and on a control signal applied to the junction of the two devices from a high impedance source. Preferably, a low impedance bias source is connected in series with the two devices to determine the voltage level at the operating terminals effective to cause variation in the correction device impedance. Another type has two parallel paths, each comprising oppositely poled asymmetrically conductive devices arranged in opposite senses in the two paths and having separate control signal sources; a common bias source may be used with this arrangement which provides for control of the device impedance by control signals of opposite polarities. In a further embodiment the emitter-collector path of a transistor is connected in series with the terminals, the control signals being applied to the base of the transistor.

Generally, a plurality of pairs of asymmetrically conductive devices will be connected in parallel between the operating terminals, each pair of devices having separate control signal and bias sources. By this means the correction device can be arranged to have a desired impedance characteristic. In particular, a plurality of such pairs of devices can be connected in parallel across the operating terminals of the correction device and so arranged that one bias source corresponds to the black level of a colour television luminance signal whilst another bias source corresponds to the white level of the luminance signal. Remaining bias sources have intermediate values such that, with constant levels of the control signals, the correction device presents a substantially constant impedance over the luminance signal amplitude range between black and white levels and this constant impedance can be arranged to provide a termination of the correction arm of the first conjugate pair of arms that has zero reflection coefficient. Subsequent change in the control signal levels will change the zero reflection coefficient and a reflected signal will be generated; due to the hybrid action of the transformer network part of this reflected signal will be fed to the second conjugate pair of arms and can be used to correct different distortion present in a signal fed to the second conjugate pair of arms over the direct electrical path.

When the differential distortion correction apparatus is used to correct differential gain distortion, the transmission delay device in the direct electrical path can be used to compensate for the phase shift in the hybrid transformer network so that the reflected signal from the correction device arrives at the output arm of the apparatus either in-phase or anti-phase with the signal that passes over the direct electrical path, depending on the sign of the reflection coefficient of the correction device.

When the differential distortion correction apparatus is used to correct differential phase distortion, the delay device in the direct electrical path can be arranged to provide a transmission delay such that the reflected and direct signals in the output arm of the apparatus are in phase quadrature. Preferably, however, the delay required to produce the phase quadrature relationship is provided by a transmission delay device providing a 45° phase shift at an operating frequency of the apparatus and inserted between the correction device and the arm of the first conjugate pair of arms to which the correction device is connected.

A differential distortion correction apparatus embodying the invention also can be used to correct both differential gain and differential phase distortions and advantageously this may be achieved by use of a single correction apparatus having separate correction devices for differential gain and phase correction. This may be done by connecting the correction arm of the first conjugate pair of arms via a hybrid matching device to a gain correction arm comprising a correction device and also to a separate phase correction arm comprising another correction device together with a transmission delay device providing a 45° phase shift at the operating frequency. The hybrid matching device ensures that reflected signals from either one of the correction devices does not pass to the other device.

As applied to the correction of differential gain and differential phase distortion in a colour television system, a correction apparatus of the type described in the preceding paragraph may be used, each correction device comprising three parallel connected signal controlled impedance paths, as previously described, and having bias source levels corresponding to black, grey and white levels of the luminance signal. The control signal source for the black level is maintained at a constant level such that the reflection coefficient of the correction device is zero at black level, whilst control signals for the grey and white levels are derived from test signals comprising "grey" and "white" pilot signals and the usual colour burst, transmitted at appropriate times during the television waveform so that interference with the television picture is avoided. After passage over a transmission system, the pilot signals and colour burst signal are fed to amplitude and phase detectors from which are derived pulses representative of the amplitudes and phases of the three test signals. From these pulses are derived two sets of control signals, one set for gain correction and the other set for phase correction, in each set one control signal being derived from a comparison of the corresponding colour burst and grey pulses and the other from a comparison of the corresponding colour burst and white pulses. These control signals are used to control the impedance of the "grey" and "white" impedance paths of the gain and phase control devices in such a sense as to correct the differential gain and differential phase distortions of which those control signals are indicative.

Figure 2:
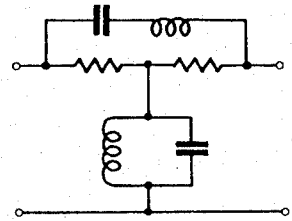
Figure 3A:
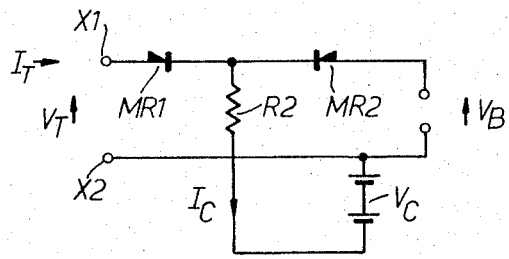
Figure 3B:
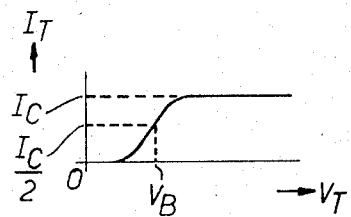
Figure 3C:
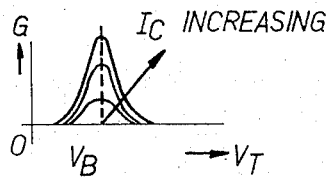
Figure 6:
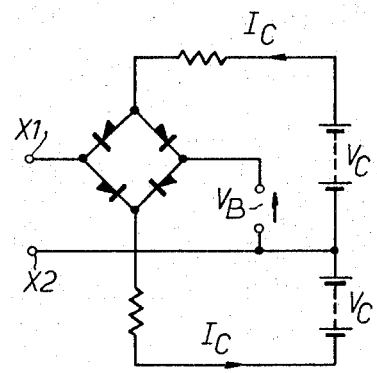
Figure 7:
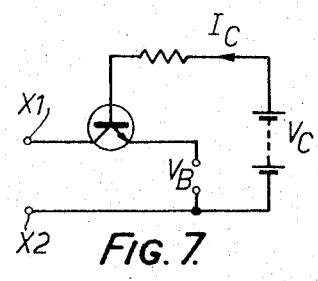
Figure 8:
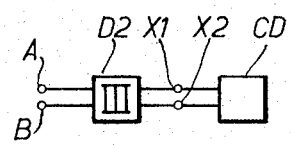
Figure 9:
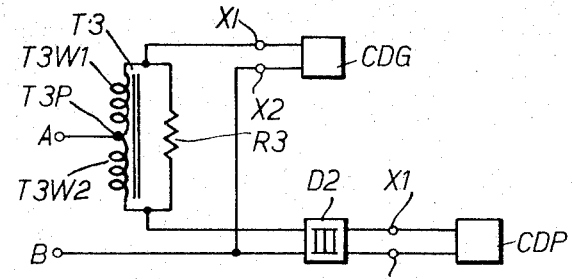
Figure 10:
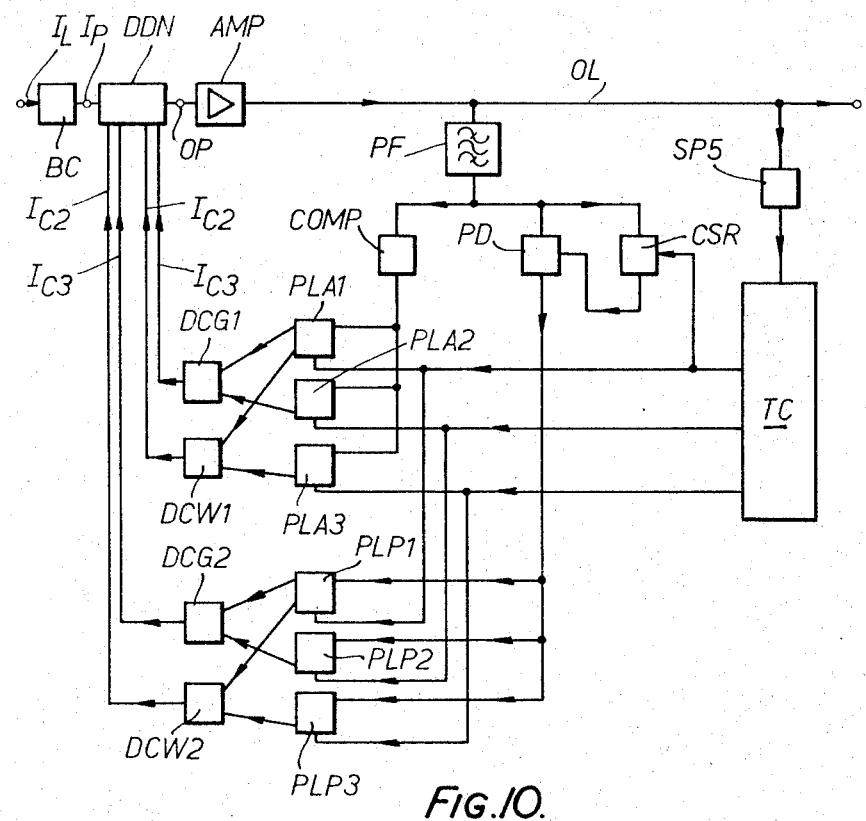
Figure 11:
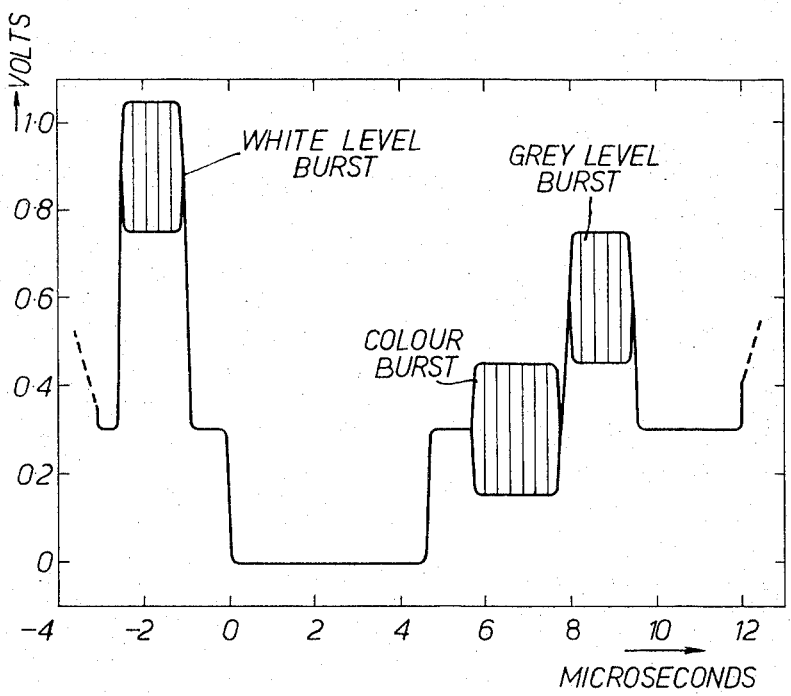

By way of example, one embodiment of the invention suitable for use in colour television systems will be described in greater detail with reference to the accompanying drawings, in which:

FIG. 1 is a schematic circuit diagram of a basic form of differential distortion correction network embodying the invention, FIG. 2 is the circuit of a component part of FIG. 1, FIGS. 3a–c is a circuit diagram of one form of correction device suitable for use with the network of FIG. 1 and also shows characteristics of that device, FIGS. 4 a–b shows a modified form of the device shown in FIG. 3, FIGS. 5–7 show alternative forms of correction devices to that shown in FIGS. 3 and 4, FIG. 8 illustrates one way of connecting a correction device to the network shown in FIG. 1 to provide differential phase correction, FIG. 9 illustrates a way of connecting two correction devices to the network shown in FIG. 1 to provide both differential gain and phase correction, FIG. 10 is a schematic circuit diagram of an automatic distortion correction control circuit, and FIG. 11 is a waveform incorporating pilot signals for operation of the circuit shown in FIG. 10.

Figure 12:
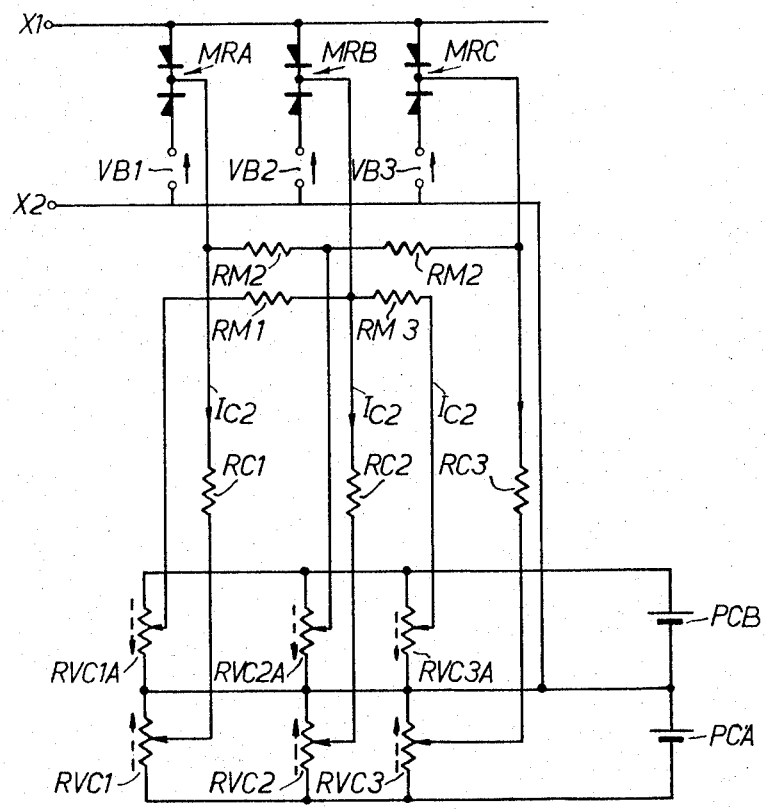

FIG. 12 is a circuit diagram of a manually controllable compensation circuit.

The differential distortion correction network is illustrated in FIG. 1 and has two hybrid transformers T1 and T2 having tapped windings comprising portions T1W1, T1W2 and T2W1, T2W2 respectively and untapped windings T1W3 and T2W3, respectively. The tapping T1P of windings T1W1, T1W2 forms an input arm for the correction network and together with the winding T1W3 forms a conjugate pair of arms of the hybrid transformer T1, the other pair of conjugate arms of that transformer comprising windings T1W1 and T1W2. The tapping T2P of windings T2W1, T2W2 together with the winding T2W3 from one conjugate pair of arms and the windings T2W1 and T2W2 form a further conjugate pair of arms of the transformer T2.

The network has an input terminal TI connected by an impedance matching pad P1 to the tapping T1P and the windings T1W3 and T2W3 are interconnected by a filter F1 having constant image impedances at all frequencies but a relatively narrow pass-band centred on the operating frequency of the network; in the application of the correction network to correction of colour television signals the operating frequency is the colour sub-carrier frequency. The winding T1W1 is connected via an adjustable transmission delay device D1 and an impedance matching pad P2 to the tapping T2P. The winding T2W1 is terminated by a balancing resistor R1 and the winding T2W2 is connected to an output terminal T0 of the network. The winding T1W2 is terminated by a correction device CD, the characteristics of which will be explained later.

The impedances of the pads P1 and P2, of the filter F1, the balancing resistor R1, and the windings ratios of the transformers T1 and T2 are so chosen in relation to the input and output impedances of the network that image impedance balance conditions are obtained. Assuming that the transformers T1 and T2 are identical they can each have turns ratios of $1+1:\sqrt{2}$. If the input and output impedances of the network each is 75 ohms, then the pads P1 and P2 each have image impedances of 75 ohms and 37.5 ohms, the filter F1 image impedances of 75 ohms, and the balancing resistor R1 a resistance of 75 ohms. A suitable form of filter is illustrated in FIG. 2 and for the impedance conditions referred to, the series arm resistors each has a resistance of 75 ohms. Other impedances and turns ratios could be employed with appropriate changes to the other components.

The operation of the network may be simply explained on the assumption that the terminals A, B (connected to the arm of the transformer T1 comprising the winding T1W2) are terminated by a resistor providing a balanced termination, i.e. in the specific case referred to above, 75 ohms. An input signal at the operating frequency applied to the input terminal TI passes via the pad P1 to the tapping T1P and, since the arms comprising windings T1W1 and T1W2 have balanced terminations, the signal splits equally between them without magnetising the transformer core but does not pass to the winding T1W3. That part of the signal passing to the winding T1W1 passes over the delay device D1 and the pad P2 to the tapping T2P and there divides equally between the balancing resistor R1 and the load connected to the output terminal T0, without magnetising the core of the transformer T2. Thus, there exists a direct transmission path, extending down to zero frequency, between the input terminal T1 and the output terminal T0.

Considering now the situation in which the termination of terminals A, B is changed slightly from the balanced condition, i.e. in the quoted case changes slightly from 75 ohms. Part of an input signal to the tapping T1P passes to the winding T1W2, as previously, but part is now reflected from the unbalanced termination of that winding and, due to the hybrid action of the transformer T1, divides equally between the input terminal arm and the winding T1W3, no part of the reflected signal passing to the electrical path containing the delay device D1 and pad P2. Those components of the reflected signal which pass to the winding T1W3 and which lie in the pass-band of the filter F1 are transmitted to the winding T2W3 and divide equally between the balancing resistor R1 and the output load ZL. Thus, in the case of a colour television test signal of the type previously referred to, the reflected components of the test signal having frequencies in the region of the colour sub-carrier pass over the transmission path T1W3, F1, T2W3 and are then added to the test signal directly transmitted to the transformer T2 over the path including the delay device D1 and the pad P2.

Variations in the terminating impedance across the terminals A, B do not affect transmission of an input signal over the direct path between the transformers T1 and T2 due to the hybrid action of transformer T1. The principal effect of variations in the terminating impedance is to provide reflected signal components that add to or subtract from the operating frequency signal components in the output arm of the correction network. Hence, by suitably controlling the terminating impedance across the terminals A and B such reflected signals can be used to correct distortions in the operating frequency signal. As applied to a colour television test signal comprising a waveform varying in amplitude between black and white levels in correspondence with a desired luminance signal characteristic and on which is superimposed a colour sub-carrier frequency sine wave, if the terminating impedance across the terminals A, B provides a non-reflecting termination over a desired range of levels of the luminance test signal and outside this range a reflecting termination the reflection coefficient of which is dependent on the luminance signal amplitude, then such variations in the terminating impedance can be used to correct the differential distortion of the colour sub-carrier signal which will arise due to such variations of the luminance signal amplitude.

In a preferred form of the correction device CD used to provide a terminating impedance across the terminals A and B, use is made of a device the impedance of which is dependent upon the signal voltage component across the terminals A, B and upon the level of a control signal fed to the device. There may be also associated with the device a bias source to determine the level of the signal voltage across the terminals A, B necessary to be effective in controlling the impedance of the device. Suitable forms of such correction devices will be described with reference to FIGS. 3–7 which lend themselves to control by an automatically variable control signal as well as by a manually variable control signal.

FIG. 3a shows a correction device CD having operating terminals X1, X2 between which two diodes MR1, MR2 are in back-to-back series connection with each other and with a low impedance bias source $V_B$ disposed between the terminal X2 and the diode MR2. A control signal source $V_C$ is connected through a high value resistor R2 to the junction of the diodes MR1 and MR2, a suitable value for R2 being of the order of 10K ohms when used in conjunction with the specific network impedances referred to previously. The control source $V_C$ determines the maximum conductance between the terminals X1 and X2 whilst the bias source $V_B$ determines the signal level across the terminals X1 and X2 required to cause the conductance between those terminals to reach that value.

Operation of the device shown in FIG. 3a may be explained as follows. Assume that the terminals X1, X2 are joined by a low impedance and the bias source $V_B$ has zero voltage. The current $I_C$ supplied by the control source $V_C$ is practically constant and divides equally between the diodes MR1 and MR2, the resistance seen looking into the terminals X1, X2 being that of the diodes MR1, MR2 in series connection and both conducting. With the voltage $V_T$ across the terminals X1, X2 equal to zero, the current $I_T$ flowing between the terminals is $I_C/2$. As $V_T$ is increased, the current $I_T$ increases with a corresponding decrease in current flow through the diode MR2 since the current flow in resistor R2 is constant at $I_C$. When the current $I_T$ equals $I_C$ it remains constant since the current flow through the diode MR2 has then reduced to zero.

If now the bias source $V_B$ provides a bias voltage in the sense shown in FIG. 3a, and no voltage is applied across the terminals X1, X2, then a similar effect takes place to that described above, except that the current flow through diode MR2 increases with increasing bias voltage and is accompanied by decreasing current flow through the diode MR1. The bias voltage can be increased beyond that corresponding to zero current flow in the diode MR1.

If, in the presence of a constant bias voltage $V_B$ an equal E.M.F. $V_T$ is applied across the terminals X1, X2, the diode MR1 will conduct a current equal to $I_C/2$. For values of $V_T<V_B$, the current flow through diode MR1 will be less than $I_C/2$ and for $V_T>V_B$ it will be greater than but will not exceed $I_C/2$. Variation of the bias voltage $V_B$ varies the voltage $V_T$ required to produce commencement of current flow through the diode MR1 and the $I_T/V_T$ relationship with a bias voltage $V_B$ applied is shown in FIG. 3b. FIG. 3c shows the variation of conductance G between the terminals X1, X2 with the voltage $V_T$ for different values of control current $I_C$; these conductance curves are the derivatives of the $I_T/V_T$ relationships and the maximum conductance occurs for a voltage $V_T$ equal to $V_B$.

Figure 4A:
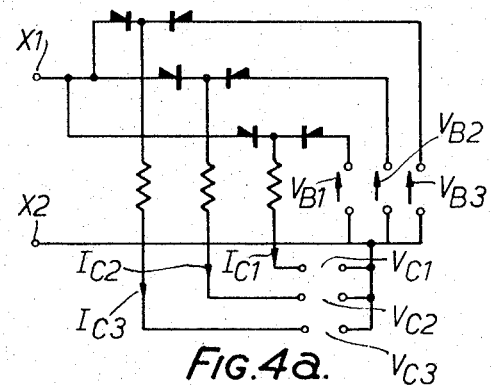
Figure 4B:
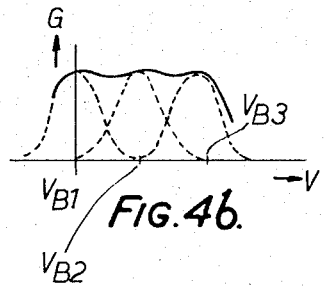

If a number of such diode networks, and associated bias and control sources, are connected in parallel between the terminals X1, X2, variations in the A.C. conductance (G) versus applied voltage ($V_T$) across the terminals X1, X2 can be obtained. For example, if three such diode networks are connected in parallel as shown in FIG. 4a, then by appropriate selection of the bias voltages $V_{B1}$, $V_{B2}$, $V_{B3}$ the composite $G/V_T$ relationship can be made practically constant over the voltage range $V_{B1}$–$V_{B3}$, as shown in FIG. 4b. If this constant value of conductance is selected so that when the correction device is connected to the terminals A, B, of FIG. 1, the device has a zero reflection coefficient, and if a television test signal of the type referred to previously is so adjusted that black level corresponds to $V_{B1}$ and white level to $V_{B3}$, then the inherent differential gain or phase distortion introduced by the correction device will be very small. If now the control currents $I_{C2}$ and/or $I_{C3}$ are varied, a wide range of conductance applied voltage ($G/V_T$) curve shapes can be obtained, and for reasonably small changes the shape of the differential gain or phase versus luminance voltage curves correspond with the $G/V_T$ curves. By adding further elementary diode networks in parallel and suitable selection of the bias voltages and control signal levels, more complex $G/V_T$ characteristics can be obtained, the television signal level being so adjusted that white level corresponds to the highest bias voltage used.

Figure 5:
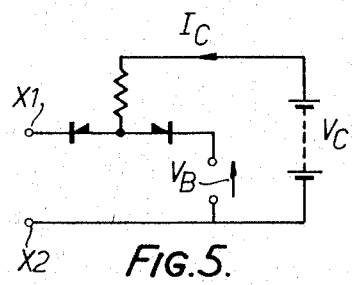

Other basic forms of controllable impedance networks on which correction devices CD can be based are illustrated in FIGS. 5, 6 and 7. FIG. 5 shows an arrangement similar to that of FIG. 3 except that the diodes are oppositely poled. FIG. 6 shows an arrangement using two pairs of diodes, one pair connected back-to-back and in parallel with the other pair, the latter pair being connected back-to-back in an opposite sense. Each pair of diodes has a separate control signal source but a common bias source is used for both pairs. FIG. 7 shows the use of a transistor in place of the pair of diodes of FIG. 3. The emitter-collector path of the transistor is connected between terminal X1 and the bias source and the control signal source is connected to the base of the transistor.

In use of the correction network shown in FIG. 1 to correct differential gain distortion, a correction device CD has its terminals X1, X2 connected directly to terminals A, B of the network, as shown in FIG. 1, and the delay device D1 is adjusted to compensate for phase shifts over the magnetic path between the transformers T1 and T2 so that the direct and reflected signals in the output arm of the transformer T2 are in-phase or anti-phase with each other, dependent upon the reflection coefficient of the termination provided by the correction device CD.

In use of the network to correct differential phase distortion, the same correction device can be used as is used for differential gain distortion correction, but the direct and reflected signals are required to be in phase quadrature in the output arm of the network. This phase relationship can be achieved by suitable adjustment of the delay device D1 but preferably is achieved by use of a further delay device D2, providing a 45° phase shift at the operating (colour sub-carrier) frequency, to connect the terminals X1 and X2 of the correction device CD to the terminals A, B of the network shown in FIG. 1. This arrangement is shown in FIG. 8. The resultant phase shift of the combined signal in the output arm is dependent on the magnitude and sign of the reflection coefficient of the termination provided by the correction device CD and is thus voltage dependent. The magnitude of the combined signal is also affected by the reflection coefficient of the correction device but the amount is not large provided the phase shift is not greater than about 20°.

Correction of both differential gain and differential phase distortions may be accomplished by connection in tandem of two correction networks, one arranged for correction of differential gain distortion and the other for correction of differential phase distorsion, in the manners previously described. However, a simpler arrangement is to use a single basic network with the terminals A and B suitably connected to separate correction devices for differential gain and phase distortion correction, respectively. One way of effecting such a connection is shown in FIG. 9, the terminals A, B of the network of FIG. 1 being connected to a hybrid device T3 having a tapped winding T3W1, T3W2 across which is connected a balance resistor R3. The tapping T3P is connected to the terminal A. The winding T3W1 is connected to the terminal X1 of a correction network CDG for differential gain distortion correction whilst the winding T3W2 is connected, in the manner described with reference to FIG. 8, via a delay device D2, providing a 45° phase shift, to terminal X1 of a correction device CDP for differential phase distortion correction. The terminal B is connected to the terminals X2 of the correction devices CDG and CDP. In use of this arrangement with the particular network impedances referred to earlier, the resistor R3 has a resistance of 300 ohms with the turns ratio of transformer T3 1:1; the delay device D2 should have an impedance of 150 ohms and the correction devices CDG and CDP should provide terminations of 150 ohms in the non-reflecting (or balanced termination) condition. Under these conditions, the two correction devices will correct differential gain and phase distortions, respectively, without interaction.

As an alternative, a single correction device could be connected to the terminals A, B as shown in FIG. 1 and the delay device D1 adjusted so that the magnitude and phase of the combined direct and reflected signals in the output arm of the network has a desired magnitude and phase angle. However, both for manual control of the correction devices as well as automatic control (i.e. of the control signal amplitude(s)), especially the latter, the arrangement shown in FIG. 9 is preferred.

In use of apparatus according to the invention for correcting differential distortion in a colour television transmission system, a suitable pilot test signal is transmitted during an appropriate part of the television waveform other than the picture line-scan period so that it does not interfere with the picture. It can be transmitted in a line interval occurring during the field blanking interval. Alternatively, the test signal could be transmitted during a (or every) line blanking interval, particularly if the synchronising pulses are modified. With this latter arrangement, the test signal would have to be removed and the television waveform restored to normal before distribution to receivers. In the arrangement to be described with reference to FIG. 10, the test signal comprises three pilot signal bursts occurring at different times and consisting of the normal colour burst, a "gray" burst and a "white" burst superimposed upon steps having levels corresponding to the luminance levels of the test bursts. FIG. 11 illustrates a line blanking pulse incorporating the usual synchronising pulse and colour burst and modified to include "grey" and "white" pilot bursts, respectively, at appropriate amplitude levels. Each of the pilot bursts has a duration of 6 cycles at the colour sub-carrier frequency.

In the arrangement shown in FIG. 10, the television waveform, including the test signal shown in FIG. 11, is applied to the input lead IL and after passing through a black-level clamp BC is fed to the input terminal IP of a differential gain and phase distortion correction network DDN. The network DDN comprises a network of the type shown in FIG. 1 having a correction device of the type shown in FIG. 9 connected to the terminals A, B and the impedance networks comprising the devices CDG and CDP being of the type shown in FIG. 4. The black-level clamp BC maintains the black-level of the test signal at a predetermined datum level, the control current IC1 for the correction device having a corresponding value. The output from the terminal OP of the network DDN is amplified by an amplifier AMP and fed to an output line OL.

The output line OL is connected to a synchronising pulse separator SP5 which controls a timing circuit arrangement TC so that the latter generates outputs at times corresponding to the colour burst and to the "grey" and "white" pilot bursts in the test signal shown in FIG. 11. The timing circuit could, for instance, be a tapped delay line delivering outputs at normal colour burst time, grey time and white time, respectively. With a waveform as shown in FIG. 11, the maximum delay required would include the time of a picture line scan. This delay could be reduced if, for example, the white level burst followed immediately upon the grey level burst instead of coming at the end of the line scan. The outputs from the timing circuit TC are applied as gating pulses to gated pulse lengthening devices PLA1, PLA2, PLA3, PLP1, PLP2 and PLP3 so that PLA1 and PLP1 are gated during the colour burst, PLA2 and PLP2 during the grey burst and PLA3 and PLP3 during the white burst. The gated pulse lengtheners PLA1 . . . PLA3, PLP1 . . . PLP3 each comprises a gate followed by a pulse lengthener. The pulse lengthener has the characteristic that when a pulse is fed to its input an output signal of corresponding magnitude is delivered and is maintained substantially unchanged until the next input pulse is received when the level of the output signal changes until it corresponds to that of the new input pulse.

FIG. 10 also includes an amplitude comparator COMP and a phase detector PD both of which receive inputs from the output line OL via a filter PF having a narrow pass-band centered on the colour sub-carrier frequency. The amplitude comparator COMP may take the form of a rectifier and smoothing circuit combination. For each burst of colour sub-carrier frequency there is delivered on the comparator output lead a pulse whose amplitude corresponds to the amplitude of the envelope of the burst concerned. The phase detector also receives an input from a colour sub-carrier signal regenerator CSR gated by the output from the timing circuit TC at the colour burst time to generate a sub-carrier signal having a known phase relative to that of the colour burst on the input signal fed to it from the filter PF. For example, the sub-carrier regenerator may be gated at normal colour burst time to allow the normal colour burst to pass to a continuously running oscillator so that the latter is synchronised with the normal colour burst, the oscillator output being fed to the phase detector PD.

A simple form of phase sensitive detector PD, suitable for use when the amplitude of the signals to be compared are equal, consists of two transistors of like conductivity type with their collector-emitter paths in series across a D.C. supply. The signals whose phase are to be compared are fed to the bases of the transistors and the output is taken from the connection between the collector of one transistor and the emitter of the other. If the two signals are of equal amplitude and are in phase the potential at the output point will not change but if there is a phase difference it will follow a sine wave of magnitude dependent on the phase difference. A rectifier converts this phase-sensitive output to D.C. for feeding to the gated pulse lengtheners. The magnitudes of the two inputs to the detector will not be equal at grey and white burst times if there is differential gain distortion but can be equalised by the use of limiters.

Thus for each set of pilot signals, i.e. comprising the colour, grey and white, bursts, the amplitude comparator COMP produces three pulses indicative of the amplitudes of the three pilot signals whilst the phase detector PD produces three pulses indicative of the phases of the three pilot signals. At the colour burst time the pulse lengtheners PLA1 and PLP1 are gated and produce output pulses, those from PLA1 being fed as datum inputs to amplitude difference circuits DCG1 and DCW1 whilst those from PLP1 are fed as datum signals to amplitude difference circuits DCG2 and DCW2. At the grey pilot burst time, the pulse lengtheners PLA2 and PLP2 are gated and feed output pulses to the difference circuits DCG1 and DCG2, respectively, whilst at the white burst time the pulse lengtheners PLA3 and PLP3 are gated and feed pulses to the difference circuits DCW1 and DCW2, respectively. In a simple form, the difference circuits DCG1/2 and DCW1/2 may take the form of a differential amplifier comprising two like conductivity-type transistors having their collector-emitter path connected in series across a D.C. supply. The input signals, the difference between which is to be determined, are fed to the bases of the respective transistors and the difference output taken from the connection between the collector of one transistor and the emitter of the other.

The difference circuits DCG1 and DCW1 produce outputs dependent on the amplitude differences between the colour burst and grey burst inputs and between the colour burst and white burst inputs and these outputs, which are representative of any differential gain distortion of the grey and white pilot bursts, are utilised as the control currents $I_{C2}$ and $I_{C3}$ for the impedance network of the differential gain distortion correction device CDG in FIG. 9. The difference circuits DCG2 and DCW2 produce outputs dependent on the phase differences between the colour burst and the grey burst inputs and between the colour burst and white burst inputs and those outputs, being representative of any differential phase distortion of the grey and white pilot bursts, are utilised as the control currents $I_{C2}$ and $I_{C3}$ for the impedance network of the differential phase correction device CDP in FIG. 9. Thus, the pilot signals illustrated by FIG. 11 automatically control the generation of control signals for correcting any differential gain and phase distortion of the colour sub-carrier signal.

It will be appreciated that in the correction devices described, the control currents $I_C$, and the control source voltages $V_C$, could be controlled manually, e.g. by potentiometer control, if so desired. One form of such a manually controlled correction device is shown in FIG. 12 and is a modification of the device shown in FIG. 4a in which three diode pairs are biased so that there is appreciable overlap between the A.C. conductance (G) versus applied control signal voltage characteristics, FIG. 4b showing the relationship when the bias voltages $V_{B1}$, $V_{B2}$, $V_{B3}$ are so chosen that the overall conductance, in the neutral condition, is reasonably constant. In operation of this circuit, when a control voltage is applied to a particular diode pair the change in conductance of that diode pair will also cause a change of conductance of the adjacent diode pair(s) with the conductance characteristic of which it overlaps. Typically, if the applied control voltage to one diode pair is made equal to the corresponding bias voltage, e.g. $V_{C2}=V_{B2}$, then the conductance of the adjacent diode pair is not zero but about 20% of the conductance in the neutral condition.

When using such a correction device in a differential distortion correction network to correct a television waveform, it is particularly important that the conductance at black level of the correction device shown in FIG. 4a, should not change when correction signals are applied at other colour levels, since the black level provides a reference from which the required control currents are determined.

FIG. 12 shows a manually controllable circuit for compensating interaction between the diode pairs of FIG. 4a when the control currents fed to an adjacent diode pair is varied. The circuit operates by feeding to a diode pair an opposite polarity compensating current when a control current is fed to an adjacent diode pair. Typically the compensating current can be 20% of the control current level.

FIG. 12 has three diode pairs MRA, MRB, MRC connected back-to-back in series between terminals X1, X2 of the control device, in the manner previously described with reference to FIG. 4a. The control currents are $I_{C1}$, $I_{C2}$, $I_{C3}$ derived from manually adjustable potentiometers RVC1, RVC2, RVC3 connected across a D.C. source PCA. The sliders of these potentiometers are connected via resistors RC1, RC2, RC3 to the junctions of the diodes of the respective pairs MRA, MRB, MRC. Each potentiometer RVC1, RVC2, RVC3 has an associated ganged potentiometer RVC1A, RVC2A, RVC3A, these being connected across a potential source PCB. The potential sources PCA, PCB and the mechanical linkages between the ganged pairs of potentiometers are such that the potentiometers of a pair deliver equal and opposite voltages.

The sliders of potentometers RVC1A, RVC2A, RVC3A are connected via resistors RM1, RM2, RM3 to the junctions of the diode pair of pairs, adjacent that pair to which the associated potentiometers RVC1, RVC2, RVC3 are connected. Thus, resistor RM1 is connetced to diode pair MRB, resistor RM2 to diode pairs MRA and MRC and resistor RM3 to diode pair MRB. The values of the resistors RM1, RM2, RM3 are such that the desired level of compensating currents IC1A, IC2A and IC3A are obtained and typically are five times the resistance of the corresponding resistors RC1, RC2, RC3.

The number of diode pairs in the control device is not necessarily limited to the number of luminance levels at which pilot colour signals are injected. For example, there might be three such levels, as described above, with a diode pair for each and with two additional diode pairs biased to points intermediate the biasing points of the three basic diode pairs. These additional diode pairs would be fed with control currents which, as just described, might be of opposite sign to those from which they are derived. However, if the range of signal voltage over which the conductance of a diode pair can be varied is very small compared with the total range of signal voltage, a smoother combined conductance characteristic (c.f. FIG. 4b) can be obtained using interpolated currents of the same sign as those from which they are derived.

In a modification of the apparatus shown in FIG. 1, and suitable for correction of differential distortion in other than colour television systems, the transformer windings T1W3 and T2W3 and the filter F1 can be omitted and a single hybrid transformer comprising the tapped windings T1W1, T1W2 and T2W1, T2W2 is used, the transformer core providing the necessary intercoupling between the windings. Otherwise, the apparatus is similar ot that described with reference to the drawings.

I claim:

1. Electrical signal differential distortion correction apparatus including a balanced hybrid transformer network having intercoupled first and second conjugate pairs of arms, of the first conjugate pair of arms one being connected to a correction impedance device adjustable to alter the balance condition of the first pair of arms, the other arm of said first pair being connected by a direct electrical path via one arm of the second conjugate pair of arms to an output arm for the apparatus, and being connected via the other arm of said second pair of arms to an output arm balance impedance, an input arm connected to both arms of the first pair of arms, and a transmission delay device connected in the said direct electrical path to effect a desired time relation between electrical signals fed from the input arm to the second conjugate pair of arms via the said direct electrical path and any electrical signals fed via the intercoupling between the first and second conjugate pair of arms as a result of the correction impedance device providing an unbalanced condition to such signals.

2. Electrical signal differential distortion correction apparatus including a balanced hybrid network having first and second transformers each having an interconnected pair of windings and a further winding, the further windings of the said transformers being intercoupled via a band-pass filter device, the said interconnected windings of the first transformer forming a first conjugate pair of arms and the interconnected windings of the second transformer forming a second conjugate pair of arms, one arm of said first conjugate pair of arms being connected to a correction impedance device adjustable to alter the balance condition of that arm, the other arm of said first conjugate pair being connected by a direct electrical path via one arm of said second conjugate pair of arms to an output arm of the apparatus and further being connected via said other one of the second conjugate pair of arms to an output arm balance impedance, an input arm for the apparatus connected to the interconnection of the said interconnected pair of windings of the first transformer and forming with the said further winding of that transformer a third conjugate pair of arms, the further winding of said second transformer together with the connection between the said direct electrical path and the said interconnected pair of windings of the second transformer forming a fourth conjugate pair of arms, and a transmission delay device connected in the said direct electrical path to provide a desired phase relation between electrical signals fed from the input arm to the second conjugate pair of arms via the desired electrical path and any electrical signals fed via the band pass filter device as a result of the correction impedance device providing an unbalanced condition to such signals.

3. Apparatus according to claim 2, in which the said hybrid transformer network is an image impedance balanced network.

4. Apparatus according to claim 3, in which the first and second transformers each has a turns ratio of $1+1:\sqrt{2}$ between the interconnected windings and the further winding of that transformer.

5. Apparatus according to claim 2, in which the correction impedance device includes an electrical signal dependent impedance arrangement.

6. Apparatus according to claim 5, in which the said impedance arrangement is an asymmetrically conductive device arrangement.

7. Apparatus according to claim 5, in which the correction impedance device is so connected to the said one arm of the first conjugate pair of arms that it provides a normally balanced termination of that arm, and in which the impedance device further includes means operable to apply a control signal to said impedance arrangement to adjust the imepdance thereof.

8. Apparatus according to claim 6, in which the said correction impedance device includes a pair of oppositely poled asymmetrically conductive devices connected in series to terminate the said one arm of the first conjugate pair of arms under normally balanced conditions, and means operable to supply a control signal to the junction of the asymmetrically conductive devices to adjust the impedances thereof.

9. Apparatus according to claim 8, including a low impedance bias source connected in series with said asymmetrically conductive devices to determine the signal level necessary across the said one arm of the first conjugate pair of arms effective to vary the impedance of said devices.

10. Apparatus according to claim 6, in which the said correction impedance device includes a plurality of series connected oppositely poled pairs of asymmetrically conductive devices the said pairs of devices being connected in parallel to terminate the said one arm of the first conjugate pair of arms under normally balanced conditions, means operable to supply separate control signals to the respective junctions of the said pairs of asymmetrically conductive devices to adjust the impedances thereof.

11. Apparatus according to claim 10, including respective low impedance bias sources connected in series with the said pairs of asymmetrically conductive devices and effective to determine the combined impedance characteristic of the pairs of said devices.

12. Apparatus according to claim 11, in which the said bias sources are such that the said correction impedance device has an approximately constant impedance over a selected range of signal input levels from the said one arm of the first conjugate pairs of arms.

13. Apparatus according to claim 10, and including means operable to adjust the levels of said control signals whereby the correction impedance device presents a non-balanced termination of the said first conjugate pair of arms at desired signal levels of that arm.

14. Apparatus according to claim 13, in which said adjustment means is manually adjustable.

15. Apparatus according to claim 13, including an adjustment means control arrangement operably responsive to variations in the electrical signal in the input arm of the correction network from a desired characteristic, said variations corresponding to differential distortion of said signal, said control arrangement controlling said adjustment means in a sense to reduce said distortion.

16. Differential gain distortion correction apparatus having correction apparatus as claimed in claim 2, wherein the said delay device is such that the said direct electrical path provides a signal transmission delay of $n\pi$ radians ($n=0, 1, 2, 3$ . . . etc.) relative to the transmission path defined by said intercoupling between the said first and second conjugate pairs of arms.

17. Differential phase distortion correction apparatus having correction apparatus as claimed in claim 2, wherein the said delay device is such that the said direct electrical path provides a signal transmission delay of $n\pi/2$ radians ($n=1, 3, 5, \ldots$ etc.) relative to the transmission path provided by the said intercoupling between the said first and second conjugate pairs of arms.

18. Differential phase distortion correction apparatus having correction apparatus as claimed in claim 2, wherein the said correction impedance device is connected to the said one arm of the first conjugate pair of arms by a transmission delay device providing a delay such that signals reflected by the said correction impedance device and passing to the output arm over the said intercoupling between the first and second conjugate pairs of arms are in phase quadrature with signals passing over the said direct electrical path.

19. Apparatus according to claim 2, for correction both of differential gain and differential distortion, in which the said correction impedance device has first and second correction impedances connected to respective ones of a conjugate pair of arms of a balanced hybrid coupling device terminating the said one arm of the first conjugate pair of arms of the hybrid transformer network, said first impedance being operable to correct differential gain distortion and said second impedance being operable to correct differential phase distortion of signals in said input arm of said hybrid network, in which the transmission delay device in the said direct electrical path is such that the direct electrical path provides a signal transmission delay of $n\pi$ radians ($n=0, 1, 2, 3 \ldots$ etc.) relative to the transmission path defined by said intercoupling between the first and second conjugate pairs of arms, and in which the said second correction impedance is connected to the balanced hybrid coupling device by a further transmission delay device providing a signal transmission delay such that signals reflected by the said second correction impedance and passing to the output arm over the transmission path defined by the intercoupling between the first and second conjugate pairs of arms are in phase quadrature with signals passing over the direct electrical path.

20. A method of correcting differential distortion in a colour television system, including the steps of transmitting to a differential distortion correction network connected in the system, and having a hybrid network providing between an input and an output of said network parallel direct and indirect electrical paths, a test waveform having at signal levels corresponding to selected luminance values a pilot reference signal and at least one pilot test signal corresponding to selected colour levels, during said transmission extracting the said reference pilot and the or each said test pilot signals from the test signal and comparing the said reference pilot signal with the or each said test pilot signal to produce error signals indicative of any differential distortion in the test signal, and feeding such error signals to control the impedance of an adjustable correction impedance device terminating one arm of the correction nework such that that arm has an unbalanced termination whereby television signals are reflected from the correction impedance device over the indirect electrical path to combine with signals passing over the direct electrical path in a desired differential distortion correcting phase relationship therewith.

21. A method according to claim 20, in which the amplitudes of the reference pilot signal and the or each test pilot signal are compared, and any error signals produced by such comparison are indicative of, and used to correct, differential gain distortion.

22. A method according to claim 20, in which the phases of the reference pilot signal and of the or each test pilot signal are compared, and any error signal produced by such comparison is indicative of and used to correct differential phase distortion.

23. Apparatus for correcting differential gain distortion by use of the method according to claim 21, including a differential distortion correction apparatus according to claim 15 in which the direct electrical path including said delay device provides a signal transmission delay of $n\pi$ radians ($n=0, 1, 2, 3 \ldots$ etc.) relative to the transmission path defined by the intercoupling between the said first and second conjugate pairs of arms, and including correction signal derivation apparatus connected to the output arm of the correction network, said derivation apparatus having means for comparing the respective amplitudes of at least two test pilot signals and the said reference pilot signal and operative to generate respective error signals in response to differences in such amplitudes, and means for feeding such error signals as the respective control signals to the pairs of asymmetrically conductive devices of the correction impedance device.

24. Apparatus for correcting differential phase distortion according to claim 22, including a differential distortion apparatus according to claim 15, in which the correction impedance device is connected to the said one arm of the first conjugate pair of arms by a transmission delay device providing a delay such that signals reflected by the correction impedance device and passing to the output arm over the said intercoupling between the first and second conjugate pairs of arms are in phase quadrature with signals passing over the said direct electrical path, and including correction signal derivation apparatus connected to the output arm of the correction network, said derivation apparatus having means for comparing the respective phases of at least two test pilot signals and the said reference pilot signal and operative to generate respective error signals in response to differences in such phases, and means for feeding such error signals as the respective control signals to the pair of asymmetrical conductive devices of the correction impedance device.

25. Apparatus according to claim 23, in which the test pilot signal correspond to "grey" and "white" colour signals and the reference pilot signal corresponds to a "colour" burst signal, in which the correction impedance device has three pairs of asymmetrically conductive devices connected in series opposition, respective bias sources connected in series with the pairs of asymmetrically conductive devices and biasing them at levels corresponding to black, grey and white luminance levels respectively, a control signal source for supplying a predetermined control current to the pair of asymmetrically conductive devices biased at "black" luminance level, and the correction signal derivation apparatus being connected to supply control currents derived from the "grey" and "white" test pilot signals to the asymmetrically conductive devices biased at "grey" and "white" luminance levels respectively.

26. Apparatus according to claim 24, in which the test pilot signals correspond to "grey" and "white" colour signals and the reference pilot signal corresponds to a "colour" burst signal, in which the correction impedance device has three pairs of asymmetrically condutive devices connected in series opposition, respective bias sources connected in series with the pairs of asymmetrically conductive devices and biasing them at levels corresponding to black, grey and white luminance levels respectively, a control signal source for supplying a predetermined control current to the pair of asymmetrically conductive devices biased at "black" luminance level, and the correction signal derivation apparatus being connected to supply control currents derived from the "grey" and "white" test pilot signals to the asymmetrically conductive devices biased at "grey" and "white" luminance levels respectively.

No references cited.

JOHN W. CALDWELL, *Primary Examiner.*

R. MURRAY, *Assistant Examiner.*